Aug. 16, 1960   J. G. BRUNI ET AL   2,949,031
MULTI-PORT LIQUID LEVEL GAUGE
Filed Feb. 4, 1955   2 Sheets-Sheet 1

INVENTORS.
John G. Bruni.
Paul E. Miller

BY
Harness, Dickey & Pierce.
ATTORNEYS

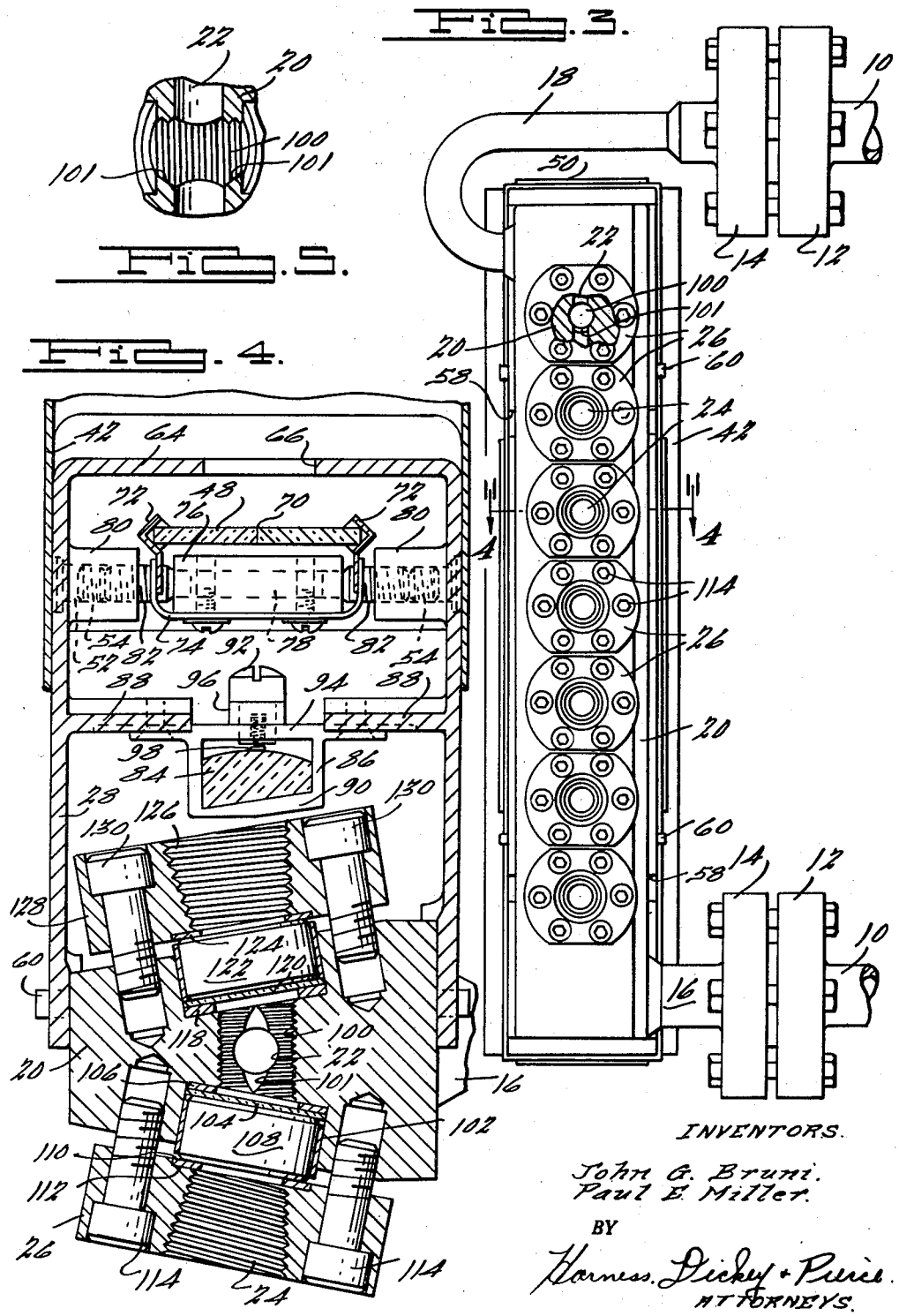

United States Patent Office 2,949,031
Patented Aug. 16, 1960

2,949,031

MULTI-PORT LIQUID LEVEL GAUGE

John G. Bruni and Paul E. Miller, Lancaster, Ohio, assignors to Diamond Power Specialty Corporation, Lancaster, Ohio, a corporation of Ohio Filed Feb. 4, 1955, Ser. No. 486,133

2 Claims. (Cl. 73—331)

This invention relates to gauges and more particularly to gauges for indicating the liquid level in high-pressure steam boilers or the like.

In the operation of high-pressure steam boilers, water-column type gauges are normally employed to provide a continuous and accurate visual indication of the water level. The design difficulties arising from the high temperatures and pressure to which such gauges are subjected can be mitigated and the cost of manufacture reduced by employing a plurality of discrete relatively small ports rather than a single large viewing aperture. These multiple ports may be arranged rectilinearly and spaced from one another, or may be staggered in two or more rows to provide continuous observation of the water level. In either case, the use of a bi-color indicating system, such as that disclosed in Patent 2,024,815, granted to Blackburn December 17, 1935, reduces the possibility or misinterpretation of the gauge indication. Such a multi-port bi-color system is disclosed in Patent 2,603,090, granted July 15, 1952, to Harry E. Brelsford, upon which the present invention is an improvement.

In practice, it has been found that under certain viewing conditions, precise interpretation of the indication provided by bi-color multi-port gauges has been impaired by improper adjustment of certain of the system elements, by reflections from the edges of the viewing apertures and by trapped water particles.

Thus, in the bi-color multi-port viewing system, a white light is filtered to provide two adjacent beams of colored light, and these beams are optically refracted by a lens directed through a portion of a column containing, for example, water or steam, or both. The disparate indices of refraction of steam and water cause one or the other of the two beams (in accordance with the nature of the contents of the viewed portion of the column) to be directed through an outer viewing port and the other to be laterally deflected against the side of that port. Inexact lateral positioning of the filters can produce inexact results both in multi-port and unitary port gauging.

Further, the deflected and non-significant beam of colored light may, under certain circumstances, be so reflected from the edges of the aperture or apertures as to produce an incorrect or at least ambiguous indication of the contents of the viewed portion of the column.

Another source of optical confusion arises from the fact that with previous gauges of the bull's-eye or multi-port type, a shoulder or lip exists at the junction between each viewing port and the fluid-containing column. Water remains on these lips, above the actual water level in the gauge, as the water level descends, and condensate is deposited thereon, in sufficient quantities so that if the bi-color illuminating system is used, the water on the lips gives rise to a color indication denoting the presence of water above the actual boiler water level. When water stands on these lips it is located, in each case directly behind a lens or window. Not only is the water visible through the window, but, due to the surface tension and to capillary effects, such water will often have a curved surface which gives it the property of a lens. Thus with a conventional bi-color gauging system using red and green screens, the water lodged on one or more of such lips, above the actual water level, may not only refract light in such a manner as to create a green or water-indicating area in a zone which is actually a steam zone, but the lens-effect of such water may greatly magnify the illuminated screen viewed therethrough, so that a very brilliant and confusing green light will be observed by the operator or water tender, and misreading of the gauge is apt to result. It is an important object of the present invention, therefore, to eliminate the danger of a misreading due to the trapping or condensing of water above the actual water level, and to improve the accuracy of performance of multi-port liquid level gauges, particularly of the bi-color type.

A feature of this invention is an adjusting means for the filter element of a bi-color liquid-level gauging system.

Another feature of this invention is a means operative in conjunction with a bi-color liquid level gauging system for preventing ambiguous readings resulting from surface reflections.

A further feature of this invention is a means for preventing water drops from so accumulating as to produce an erroneous indication in a water-column gauge.

A further feature of this invention is an improved supporting means for an illuminated water-column type gauge for facilitating servicing of the equipment.

The manner of accomplishment of the foregoing object, the nature of the foregoing features, and other objects and features of the invention will be understood from the following detailed description of an embodiment of the invention when read with reference to the accompanying drawings in which:

Fig. 3 is a side elevational view of the structure shown in Fig. 1, with certain parts being cut away to show certain internal relationships of the elements more clearly;

Fig. 4 is a sectional view taken substantially along the line 4—4 of Fig. 3; and Fig. 5 is a fragmentary vertical sectional view more clearly to present certain details of the port construction.

Figure 1:
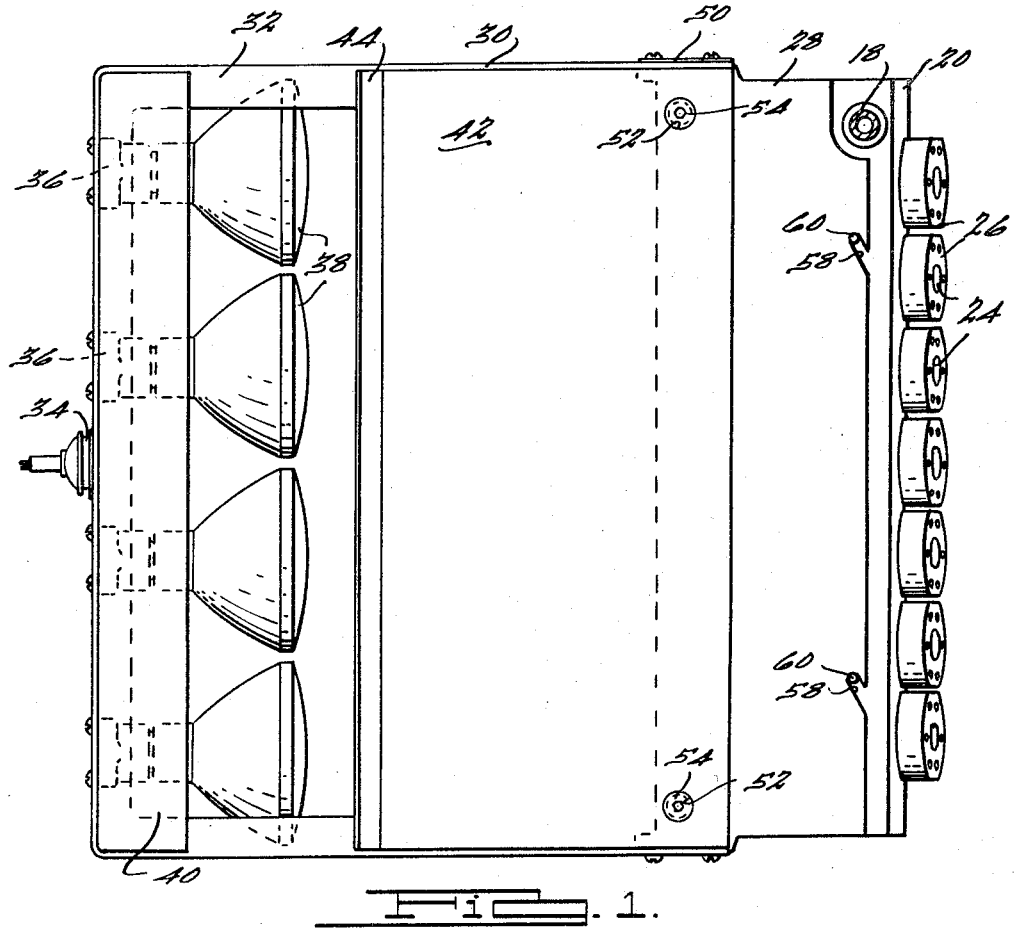
Figure 1 is a side elevational view of a gauging structure embodying the principles of the invention.

Referring first to Fig. 3 of the drawings, a pair of pipes 10, terminating in flanges 12, are connected to and communicate with a boiler the water level of which is to be observed. Each of the flanges 12 is associated with a mating flange 14, one of which is integral with a lower pipe 16 and the other of which is integral with an upper pipe or gauge loop 18. Each of the pipes 18 and 16 is rigidly affixed to a gauge body 20 and communicates with the upper and lower ends, respectively, of a vertically extending columnar passage defined by a bore 22 extending longitudinally within the body 20.

Figure 2:
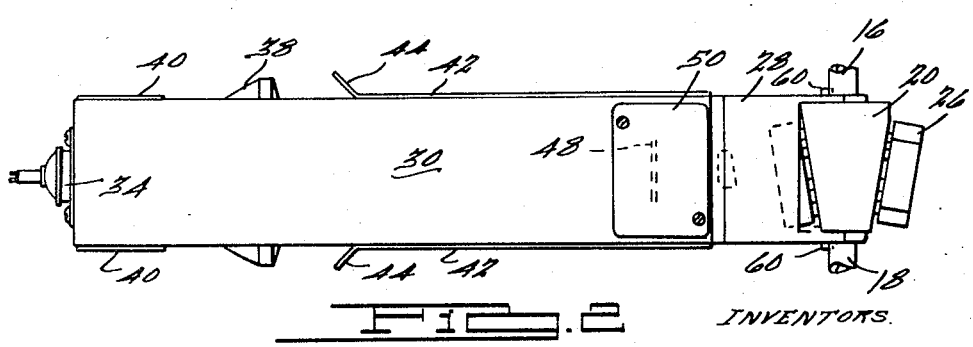
Fig. 2 is a top elevational view of the structure shown in Fig. 1.

The contents of bore 22 are observable through a plurality of sight ports 24, each of which is exteriorly defined by an outer cover plate 26 screwed or otherwise affixed to the body 20, as may be seen in Figs. 1 to 3 of the drawings. The ports 24 and the cover plates 26 may be generally circular in configuration, with upper and lower segments deleted on the cover plates 26 to permit closer spacing of the ports 24.

The body or center plate 20, which is supported by the aforesaid pipes, in turn supports an illuminator body portion 28 and a lamp house assembly 30, as may best be seen in Figs. 1 and 2 of the drawings. The lamp house assembly 30 comprises an essentially U-shaped sheet-metal lamp housing frame 32, the vertically extending rearmost portion of which supports a plug receptacle 34 associable with a source of line voltage and electrically connected to a plurality of receptacles 36 into each of which is placed a lamp 38. The sides of the lamp house assembly 30 adjacent the lamps 38 are open, although a pair of vertical stiffeners 40 can be mounted to the lamp housing frame 32 overlying the receptacles 36 without unduly impairing the ventilation of the lamp 38. In order to channel the light emanating from the lamps 38 forwardly within the lamp house assembly 30, the rear edges of side plates 42 are bent outwardly to define light deflecting portions 44.

The sheet-metal lamp housing assembly 30 telescopes over and is affixed in any suitable manner to the illuminator body portion 28 which may be a casting.

A filter or color screen 48 (Fig. 2), which will be described hereinafter, is mounted within the area defined by the overlapping portions of the lamp housing assembly 30 and the illuminator body portion 28. Consequently, both of these portions are apertured at their top to permit the insertion and removal of the color screen 48, those apertures being covered by a top plate 50. Additionally, the color screen 48 is adjustably mounted, in a manner hereinafter to be described, and to this end the lamp housing assembly and the illuminator body portion 28 are provided with four pairs of aligned apertures 52, one pair on each side, to accept adjusting screws 54.

The illuminator body casting 28 is provided with a pair of angled slots 58 (Fig. 1) along the front edge of each of its side members, each of those slots being engageable with a stud 60 integral with the center plate 20. In this fashion, the lamp house assembly 42 and the illuminator body portion 28 are supported upon the center plate 20 which, in turn, is supported by the pipes 16 and 18.

Light rays from the lamps 38 are filtered, refracted, and emitted through the port apertures 24. The means by which the filtering and refracting functions are performed may best be seen in the sectional view represented in Fig. 4 of the drawings. In this view, the substantially parallel light rays emanating from the lamps 38 (not shown in this view) are partially blocked by the end plate 64 of the illuminator body portion 28, but a portion of those rays are channeled through an aperture 66 to be directed at, and through, a color screen 48.

Color screen 48 is an elongated strip of transparent or translucent material, the two vertical halves of which transmit light of disparate colors, e.g., red and green. Color screen 48 can be a single sheet extending substantially the height of the entire assembly, or a plurality of bi-colored strips can be provided, each of which is aligned with one of the ports 24 or with a group of the ports 24.

As will be perceived from the ensuing description, the line of demarkation 70 between the colored halves of the screen 48 must be reasonably precisely positioned laterally in the assembly. It has been found to be desirable to provide means for adjusting this lateral position, as well as means for adjusting the parallelism between the line of demarkation 70 and the center line through the several ports 24. To support the color screen 48 and yet provide this desirable adjustability, the screen is clasped between a pair of guides 72, each of which engages one of the sides of the color screen 48 through substantially the entire length of that screen or the plurality of screens if such are employed. Each of the guides 72 is affixed near its top as well as near its bottom to a U-shaped spring clamp 74. Spring clamps 74 are appropriately positioned so as not to obstruct the passage of light through any port.

Each spring clamp 74 is in turn screwed or otherwise affixed to an individual carrier 76. Each carrier 76 is transversely bored as at 78, the ends of the bore desirably being chamfered, and each bore 78 is aligned with individual pairs of the previously described apertures 52 extending through the lamp house assembly 42 and the illuminator body casting 28. As may be seen in Fig. 4 of the drawings, a boss 80 is provided adjacent each of the apertures 52 in the illuminator body casting 28, each of these bosses being tapped so as threadedly to accept an adjusting screw 82. The inner end of each adjusting screw 82 is of reduced diameter so as to be insertable within a bore 78 in the carriers 76, and the intermediate portion of each adjusting screw 82 is preferably tapered to engage the chamfered end portion of the bore 78.

It will be perceived that by appropriately adjusting each of the pairs of adjusting screws 82, the upper and lower carriers 76 may be independently moved laterally of the total assembly, laterally to shift the upper and lower ends, respectively, of the color screen 48. In this manner, the entire screen 48 may be moved laterally and its center line 70 may be appropriately tilted to establish the requisite parallelism. When the adjustment is complete, it may be maintained by inserting locking screws 54 in the tapped bosses 80, abutting the adjusting screws 82.

The bi-color rays passing through the color screen 48 are refracted by a strip lens 84 which extends substantially the height of the entire assembly and is supported within lens holders 86 rigidly retained upon webs 88 extending inwardly of the illuminator body casting 28. The lens holders 86, as the color screen carriers 76, are relatively narrow members appropriately located so that they do not obstruct light directed toward the ports 24. Upper and lower lens holders 86 are provided, and one or more intermediate lens holders may be employed if the strip lens 84 is in more than one section.

The strip lens 84 is maintained in engagement with the forward wall 90 of each lens holder 86 by means of a holding screw 92 threaded into the rearmost wall 94 of the lens holder 86 but spaced therefrom by means of a spacer 96, and axially bored to accept a holding spring 98 which is of the compression type and exerts a force upon the strip lens 84.

The bi-color light, as refracted by the lens 84, is further refracted in the center plate assembly. It will be recalled that the center plate 20 is provided with a columnar bore 22 which is connected to the boiler under observation so that the bore 22 is filled with steam or water, or is partially filled with water with steam thereabove. The center plate 20 is provided with a series of transverse light-transmitting apertures 100, each of which intersects the bore 22 and each of which is aligned with an individual one of the sight ports 24 represented in Fig. 3 of the drawings. Therefore, not only the bore 22 but also the apertures 100 are filled with exceedingly hot water or steam. Escape of this fluid through any port 24 is prevented by a gauge glass assembly. A transparent barrier 104, preferably made of mica since it is in engagement with the hot fluids, is seated within an outer cylindrical recess 102 in the center plate 20. The barrier 104 is sealed within the recess 102 by means of a gasket 106 which must have special characteristics adapting it to prevent seepage of the steam or hot water and to withstand the conditions to which it is subjected. A "chevron" type gasket comprising interleaved layers of metal and asbestos has been found satisfactorily to perform the function.

A gauge glass 108 is seated within the recess 102, abutting the mica barrier 104. The glass 108 is shown to project beyond the front face of the center plate 20 and to engage a gasket 110 seated within a recess 112 formed in the inner face of the outer cover plate 26. The tightness of the engagement between the several elements is controlled by adjusting the several machine screws 114 which fasten the outer cover plate 26 to the center plate 20.

It will be noted that the loose gauge glass technique disclosed in the aforesaid Brelsford patent may be employed in the present construction.

Corresponding parts similarly arranged constitute an inner gauge assembly. Thus, a gasket 118, a mica barrier 120, an inner gauge glass 122 and a gasket 124 are sequentially juxtaposed between the aperture 100 and the tapered light port aperture 126 in the inner cover plate 128, that inner cover plate being affixed to the center plate 20 by means of machine screws 130.

By virtue of this construction, the bi-color light, as refracted by the lens 84, is directed through the tapered light port 126 in the inner cover plate 128 and through the transparent inner gauge glass 122 and mica barrier 120 to the fluid-filled volume defined by the transverse aperture 100 and a portion of the bore 22. In this area, the light rays are again deflected, the extent of that deflection being a function of the index of refraction of the fluid. The lens formula and the relative orientation of the several parts are such that the rays emanating from one portion of the color screen 48 will be directed through the sight port 24 whereas the rays emanating from the other portion of the color screen 48 will be deflected against the side wall of the port 24, depending upon the nature of the fluid content of the bore 22 and aperture 100, for any particular port. With the arrangement shown in Fig. 4 of the drawings, the light passing through that portion of color screen 48 to the left of the center line 70, as refracted by lens 84, will be redirected to pass directly through the port 24 if the bore 22 and aperture 100 contain steam, but will be deflected so as to strike the side walls of port 24 if water is present in the area being viewed. Conversely, the light rays passing through that portion of the color screen 48 to the right of the center line 70, as refracted by lens 84, will be directed through the center of the port 24 if water is present in the bore 22 and aperture 100, and will be deflected to impinge upon the side walls of the port 24 if they pass through steam. As a consequence, a viewer or a television camera will see a disc of one color if there is steam within the particular viewing port and will see a disc of another color if water is present within the particular viewing port. Obviously, if the line of demarkation between the water and steam intersects the particular viewing port, the upper portion of the disc will be of one color and the lower portion will be of the other.

A portion of the light passing through the color screen 48 and refracted by the lens 84 will strike the side walls of the tapered light port 126 in the inner cover plate 128, a portion will strike the side walls of the transverse passage 100 in the center plate 20, and, as above noted, a substantial portion of the remaining light, approximately half, will strike the side walls of the tapered viewing port 24 in the outer cover plate 26. Reflections from these surfaces tend to reduce the clarity of the resultant image and impair precise color identification. Such internal reflections tend particularly to cause confusion when the resultant image is monochromatically reproduced by television equipment.

In practice, the use of ostensibly non-reflective coatings upon these several surfaces has not proved to be totally satisfactory. The basis of the difficulty resides in the fact that the angle of incidence of the light rays upon the aforesaid surfaces is such that any rays which are reflected tend to rebound in a direction in which they will be sensed by the viewer or television optical system. A suitable remedy has been found to be to reconform all of those surfaces upon which light rays can be incident so that the reflected rays will be directed away from the line of view. Thus, the inner surface of the light port 126, the inner surface of the transverse passage 100 and the inner surface of the viewing port 24 are shown to be provided with a plurality of serrations. Those surfaces of the serrations upon which light rays can be incident are so inclined that reflected rays will be directed away from the line of vision so that they cannot be sensed. These serrations may either comprise a plurality of spaced concentric rings or may be in the form of a helix. In the latter case, they may be conveniently formed in the outer and inner cover plates 26 and 128 by employing a tapered tap, and may be conveniently formed upon the inner surface of passage 100 by using a straight tap. The nature of the serrations upon the inner surface of each passage 100 may also be seen in the fragmentary vertical sectional view shown in Fig. 5 of the drawings.

This construction permits the individual viewing ports to be tapered and relatively large, thereby to improve the ease of viewing.

As aforesaid, in its basic form, the fluid containing portions include a vertically extending columnar bore 22 intersected by a plurality of transverse light passages 100. Since each of the passages 100 is greater in length than the diameter of the bore 22, a small ledge is formed adjacent each of the mica barriers 104 and 120. When the water level falls, water tends to be caught upon this ledge; in other cases where only steam is present, condensate may form on these ledges. In either case, there tends to be produced an indication that the water level is at a point just above the lower edge of any given viewing port. As stated, the light refracted through such trapped water may be very brilliant, so that from a distance the window might for example seem green rather than red, or a misreading could easily be made, with results that might well be disastrous. As is represented in Figs. 3, 4 and 5 of the drawings, this condition has been eliminated by chamfering the bottom of each of the passages 100 at, for example, twenty-five degrees so that each of the aforesaid ledges is replaced by a sloping surface 101 to which water drops will not adhere. As a result, unless the water level has in fact risen to a point where it covers part of the viewed port, no indication will be transmitted that any water is present in the viewed area. As is well known, the rate of formation of condensate in such gauges under operating conditions is often high, so that condensate will be present and will be forming continuously in the steam space above the water level in the bore 22, and will always tend to flow downwardly on all of the walls. It should be noted that the serrations in the transverse light passages 100 intersect the sloping lips 101 at the front and rear ends of such transverse passages (see Figure 5) so that the condensate is channeled and confined in the bottoms of the serrations and is guided thereby away from the glass, flowing downwardly in a confined manner within such serrations. The water of condensation in the steam space above the water level is thereby completely prevented from overlying the glass, so that unwanted water-refraction in the steam space is effectively guarded against and prevented. Even a small amount of water-refraction, which could occur without this safeguard, would cause a diverging ray of light of the wrong color to be thrown out through a window above the water level, so that the gauge, viewed through any angle subtended by the ray, would give a dangerously misleading reading by showing a higher water level than that actually prevailing in the boiler.

By virtue of the above-described improvements, the viewed representation is clear and definitive in that there can be no erroneous indication due to trapped or accumulated water above the actual level overlying the glass or visible through the sight pasages, there are no misleading reflections from the orifice walls, and the color screen may be accurately and precisely positioned so that there is no misleading color representation resulting from improper placement of that screen with reference to the refractive elements of the system.

While it will be apparent that the embodiment of the invention herein disclosed is well calculated to fulfill the object above stated, it will be appreciated that the invention is susceptible to modification, variation and change

What is claimed is:

1. In a liquid level gauge, particularly for indicating boiler water level, a body portion having a generally upright elongated, columnar pasage for liquid and vapor and within which a liquid level is adapted to be maintained, a transverse light passage having walls intersecting an intermediate portion of said columnar passage, a light-transmitting barrier sealing the outer end of said transverse passage and forming with the walls of said transverse passage a lateral pocket opening into said columnar passage, a bottom drain portion in said pocket extending inwardly and downwardly from a position near the barrier to juncture with said columnar passage at a lower position, the walls of said transverse passage being provided with serrations extending in substantially vertical planes and intersecting and terminating at opposite sides of said drain portion, whereby any condensate in said columnar passage and pocket above a liquid level therein may be guided downwardly and away from said barrier, within said serrations and thence onto and downwardly through said drain portion to a position below the barrier while being prevented from attaining a position where such condensate would overlie any part of the light passage through the barrier.

2. In a liquid level gauge, particularly for indicating boiler water level, a body portion having a generally upright elongated, columnar passage for liquid and vapor and within which a liquid level is adapted to be maintained, a plurality of transverse light passages, having walls intersecting and projecting in opposite directions from intermediate portions of said columnar passage, a light-transmitting barrier sealing each outer end of each of said transverse passages and forming with the walls of said transverse passages a plurality of lateral pockets opening into said columnar passage, a bi-color illuminating system of the Blackburn type for selectively projecting light of different colors through said transverse passages in such manner that the transmitted color depends upon the index of refraction of the material in the passages, a bottom drain portion in each of said pockets sloping inwardly and downwardly from a position near the barrier to juncture with said columnar passage at a lower position, the walls of said transverse passage being provided with serrations extending in substantially vertical planes and intersecting and terminating at opposite sides of said sloping drain portion, whereby any condensate in said columnar passage and pockets above a liquid level therein may be guided downwardly and away from said barrier, within said serrations and thence onto and downwardly through said drain portions to positions below the barriers while being prevented from attaining positions where such condensate would overlie any part of the light passages through the barriers.

References Cited in the file of this patent

UNITED STATES PATENTS

| | | |
|---|---|---|
| 1,114,022 | Olbrantz et al. | Oct. 20, 1914 |
| 1,672,683 | Knoderer | June 5, 1928 |
| 1,703,426 | Kerr | Feb. 26, 1929 |
| 1,756,577 | Weston | Apr. 29, 1930 |
| 1,965,820 | Ayers et al. | July 10, 1934 |
| 2,024,815 | Blackburn | Dec. 17, 1935 |
| 2,050,207 | Corey | Aug. 4, 1936 |
| 2,091,597 | La Force | Aug. 31, 1937 |
| 2,164,747 | Landis | July 4, 1939 |
| 2,197,184 | Kemp | Apr. 16, 1940 |
| 2,498,581 | Rogers | Feb. 21, 1950 |
| 2,512,231 | Hart | June 20, 1950 |
| 2,603,090 | Brelsford | July 15, 1952 |

FOREIGN PATENTS

| | | |
|---|---|---|
| 4,207 | Great Britain | 1876 |
| 275,467 | Germany | July 27, 1913 |
| 228,486 | Great Britain | Feb. 5, 1925 |

OTHER REFERENCES

A publication entitled the Diamond Bi-Color Water Gauge and Illuminator by the Diamond Power Specialty Corp., Detroit, Michigan, Bulletin #847. (A copy was received in Div. 36 of the U.S. Patent Office, Jan. 2, 1934, and is found in 72-293.)

UNITED STATES PATENT OFFICE

CERTIFICATE OF CORRECTION

Patent No. 2,949,031                  August 16, 1960

John G. Bruni, et al.

It is hereby certified that error appears in the printed specification of the above numbered patent requiring correction and that the said Letters Patent should read as corrected below.

Column 4, line 68, for "frant" read -- front --; column 5, line 4, after "inner gauge" insert -- glass --; column 7, line 6, for "pasage" read -- passage --.

Signed and sealed this 4th day of April 1961.

(SEAL)
Attest: ERNEST W. SWIDER
Attesting Officer

ARTHUR W. CROCKER
Acting Commissioner of Patents